(No Model.) 2 Sheets—Sheet 1.
M. WILCOX.
MICROMETER CALIPERS.
No. 536,676. Patented Apr. 2, 1895.
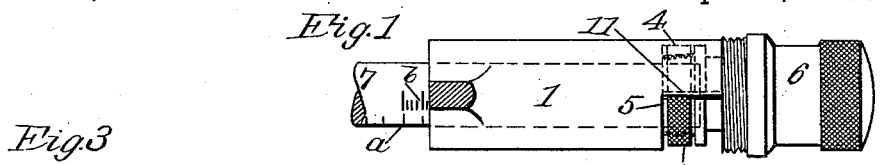
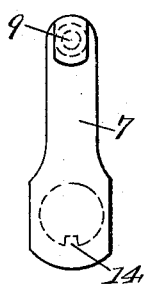
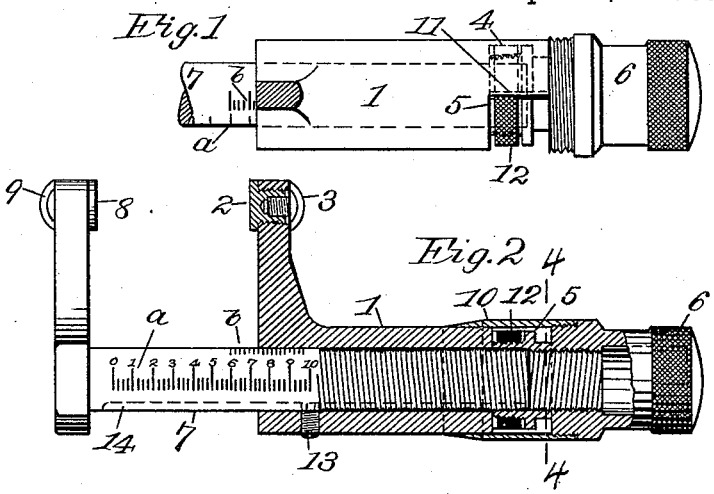
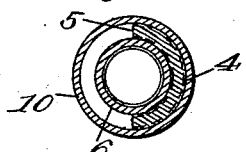
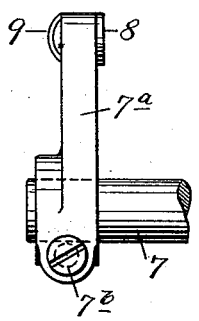
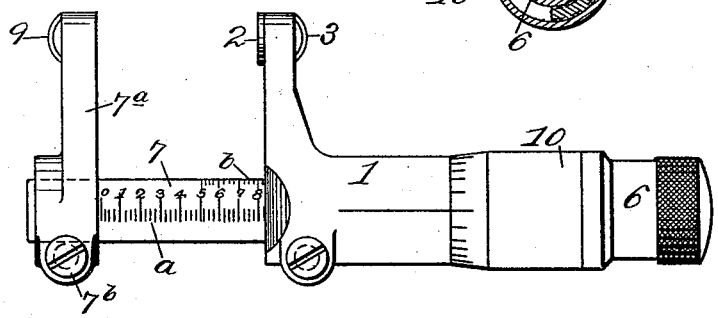
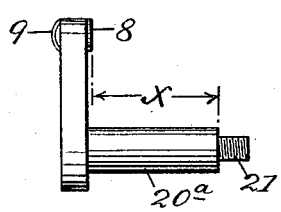
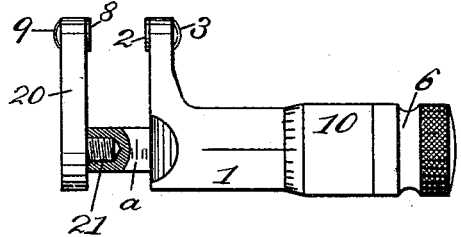
Witnesses:
Ed. E. Claussen
H. Maltner
Inventor:
Mills Wilcox (No Model.) 2 Sheets—Sheet 2.

M. WILCOX.
MICROMETER CALIPERS.

No. 536,676. Patented Apr. 2, 1895.

Witnesses:
A. Mutter
A. S. Howe

Inventor:
Mills Wilcox.
By his Attorney,
Ed. S. Claussen

UNITED STATES PATENT OFFICE.

MILLS WILCOX, OF HARTFORD, CONNECTICUT.

MICROMETER-CALIPERS.

SPECIFICATION forming part of Letters Patent No. 536,676, dated April 2, 1895.

Application filed September 14, 1894. Serial No. 523,027. (No model.)

*To all whom it may concern:*

Be it known that I, MILLS WILCOX, a citizen of the United States, residing at Hartford, in the county of Hartford and State of Connecticut, have invented certain new and useful Improvements in Micrometer-Calipers, of which the following is a full, clear, and exact specification.

This invention has reference to an improvement in micrometer calipers or gages which may be used as an outside or an inside caliper to determine with the greatest accuracy the measurement of a plug or the hole of its corresponding ring, the object of this invention being to construct the caliper so that the principle of the well known U or horseshoe caliper with a micrometer screw is retained but which can only be used as an outside caliper.

This invention also consists of improvements in adapting the micrometer to receive elongating bars which enlarges the scope and greatly extends the area of its adaptability to which it has hitherto been applied.

The terms "inside" and "outside" caliper as hereinafter used is identical with that as used in practice, that is, an inside caliper is an instrument with which is determined the exact and accurate dimension of a hole, and an outside caliper is an instrument designed to measure the diameter of a cylinder or thickness of any material.

Figure 9:
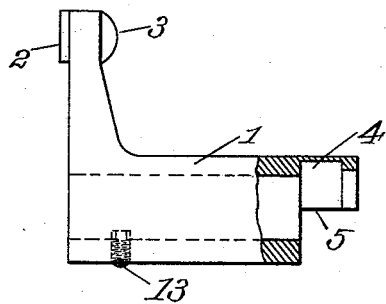
Figure 10:
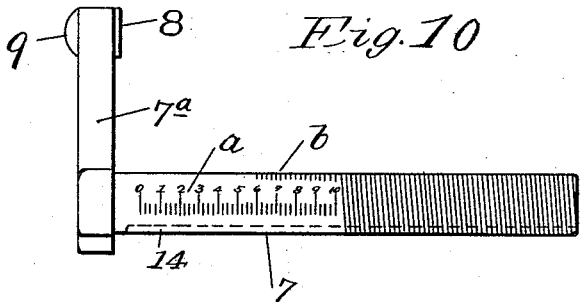
Figure 11:
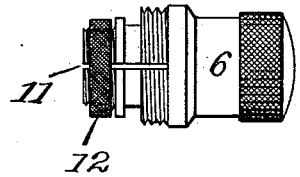

In the accompanying drawings Figure 1 represents a partial plan of my improved micrometer gage. Fig. 2 is a sectional side view; Fig. 3, an end view, and Fig. 4 a section on line 4—4 of Fig. 2. Fig. 5 is a side view of a modification of the beam made in two parts. Fig. 6 represents the same modification as that of Fig. 5 showing an elongating bar. Fig. 7 is a side view of a modified form in which the beam is made of two parts screwed together. Fig. 8 is a side view of similar construction applied to an elongating bar. Fig. 9 represents a side view of the frame 1, partly in section; Fig. 10, a side view of the L shaped beam 7, and Fig. 11 a plan view of the nut 6.

The numeral 1 represents a frame carrying the gage points 2 and 3. The lower end of the frame 1 is cylindrical in form and hollow, has a recess 4 milled therein which is partly cut away as at 5, forming approximately a crescent shape socket, adapted to receive a nut 6. This nut 6 is internally threaded and engages with the correspondingly threaded member of an L shaped beam 7, generally called the micrometer screw, and which passes through the frame 1 and adapted to move longitudinally, carrying with it the gage points 8 and 9. The nut 6 is also provided with an external thread to receive the barrel 10, which has graduations on its circumference, generally twenty-five divisions; which also serves to hold the nut from dropping out of its crescent shape socket. The nut 6 is revolved to bring the gage points 2 and 8 or 3 and 9 respectively nearer to or farther away from each other as the case may be. The beam 7 is graduated longitudinally with the two sets of scales $a$ and $b$ corresponding with the pitch of the micrometer screw, which is in practice forty threads to one inch.

The graduated scale $a$ is used, when determining the thickness of any material or using the instrument as an outside caliper. The graduated scale $b$ is used, when determining the hole of a ring or when the instrument is used as an inside caliper. The graduations on the barrel being twenty-five divisions, the pitch of the screw forty, advances the gage points one thousandth of an inch for one twenty fifth, or one division of the barrel. This is a common and well known arrangement for the movement of a micrometer spindle.

To take up the wear of the nut 6 on the micrometer screw, so that it will bear firmly and still can be turned readily, the nut 6 is slitted as at 11 and provided with a tapering thread upon which is screwed a thimble 12, to adjust the bearing of the nut on the micrometer screw.

13 is a set screw, held in the cylinder of the frame and engages into the spline 14 of the beam to prevent the same from turning.

A modification is shown in Fig. 5 which consists in making the beam in two pieces 7 and 7ª the latter clamped onto the former by the screw 7ᵇ.

In Fig. 6 is shown an elongating bar instead of a short beam.

In Fig. 8, the numeral 20 indicates one member of the L beam screwed on to the beam proper, and in Fig. 9, 20ª shows the elongating bar in which X may be one, two, &c., inches.

I claim as my invention—

1. In a micrometer caliper the combination of an L shaped frame, one member provided with a gage point, the other member cylindrical and terminating with a crescent shape socket adapted to receive a nut upon which is mounted a barrel provided with circumferential graduations, an L shaped beam one member provided with a gage point, the other member provided with a graduated scale and a screw thread and passing through the cylindrical portion of the frame and engaging the nut, all combined and operating substantially as described.

2. In a micrometer caliper the combination of an L shaped frame, one member provided with a gage point, the other member cylindrical and terminating with a crescent shape socket adapted to receive a nut upon which is mounted a barrel provided with equidistant circumferential graduations and adapted to hold the nut in its socket, an L shaped beam, one member provided with a gage point, the other member cylindrical and provided with a graduated scale and a screw thread and passing through the cylindrical portion of the frame and engaging the nut all combined and operating substantially as described.

3. In a micrometer caliper the combination of an L shaped frame 1 with the gage point 2, crescent shape socket 5 and feather 13, the nut 6 mounted in the socket and held in position by the barrel 10 provided with equidistant circumferential graduations, an L shaped beam 7, with gage point 8, spline 14, scale $a$ and the micrometer thread and passing through the frame 1 and engaging the nut 6 substantially as described.

4. In an "in" and "outside" micrometer caliper the combination of an L shaped frame, one member provided with a pair of gage points the other member cylindrical and terminating with a crescent shape socket adapted to receive a nut on which is mounted a barrel provided with circumferential graduations, an L shaped beam, one member provided with a pair of gage points, the other member provided with a set of graduated scales and a screw thread, the graduations corresponding with the pitch of the thread and passing through the cylindrical portion of the frame and engaging the nut all combined and operating substantially as described.

5. In an "in" and outside caliper the combination of an L shaped frame, one member provided with a removable gage point, the other member cylindrical and terminating with a crescent shape socket adapted to receive a nut upon which is mounted a barrel provided with circumferential graduations and adapted to hold the nut in its socket, an L shaped beam, one member provided with a set of adjustable gage points, the other member cylindrical and provided with a set of graduated scales and a screw thread and passing through the cylindrical portion of the frame and engaging the nut all combined and operating substantially as described.

6. In a micrometer caliper the combination of an L shaped frame, one member provided with a gage point, the other member cylindrical and terminating with a crescent shaped socket adapted to receive a nut surrounded by a barrel with circumferential graduations, a beam consisting of two detachable members, one member provided with a gage point, the other member adapted to be secured thereto to form an elongating bar and provided with a scale and a screw thread and passing through the cylindrical part of the frame and engaging the nut all combined and operating substantially as described.

7. In a micrometer caliper the combination of an L shaped frame, one member provided with a gage point, the other member cylindrical and terminating with a crescent shaped socket adapted to receive a nut surrounded by a barrel with circumferential graduations, a beam consisting of two detachable parts, one part of substantially an L form and provided with a gage point, the other part adapted to be secured thereto to form an elongating bar and provided with a scale and a screw thread and passing through the cylindrical part of the frame and engaging the nut all combined and operating substantially as described.

MILLS WILCOX.

Witnesses:
EDWARD E. CLAUSSEN,
W. H. HONISS.